May 22, 1951  R. BRANNIN  2,553,546
AIRPLANE AUTOMATIC PILOT
Filed Jan. 31, 1945  4 Sheets-Sheet 1

INVENTOR
RICHARD BRANNIN
BY Herbert H. Thompson
HIS ATTORNEY

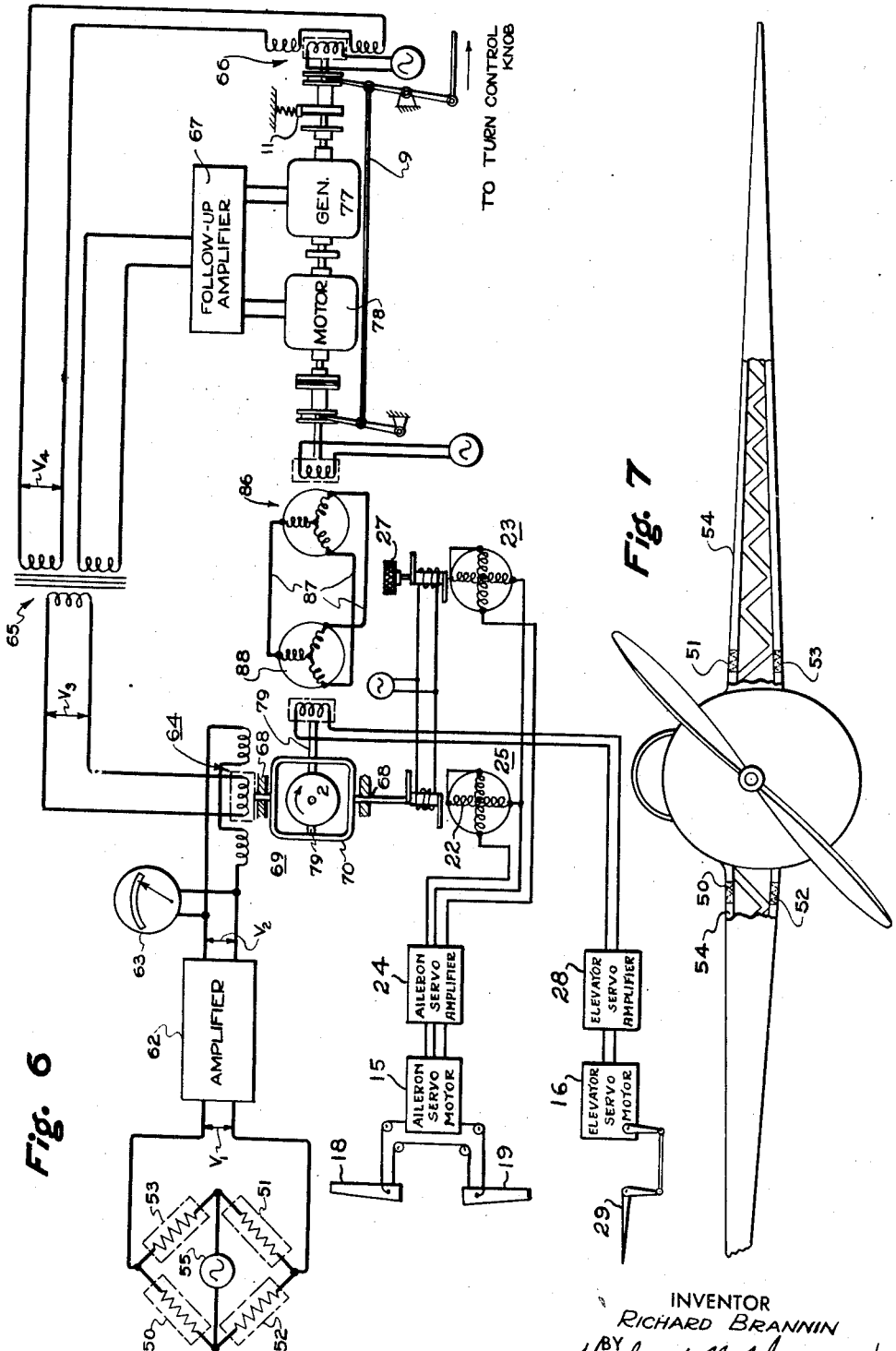

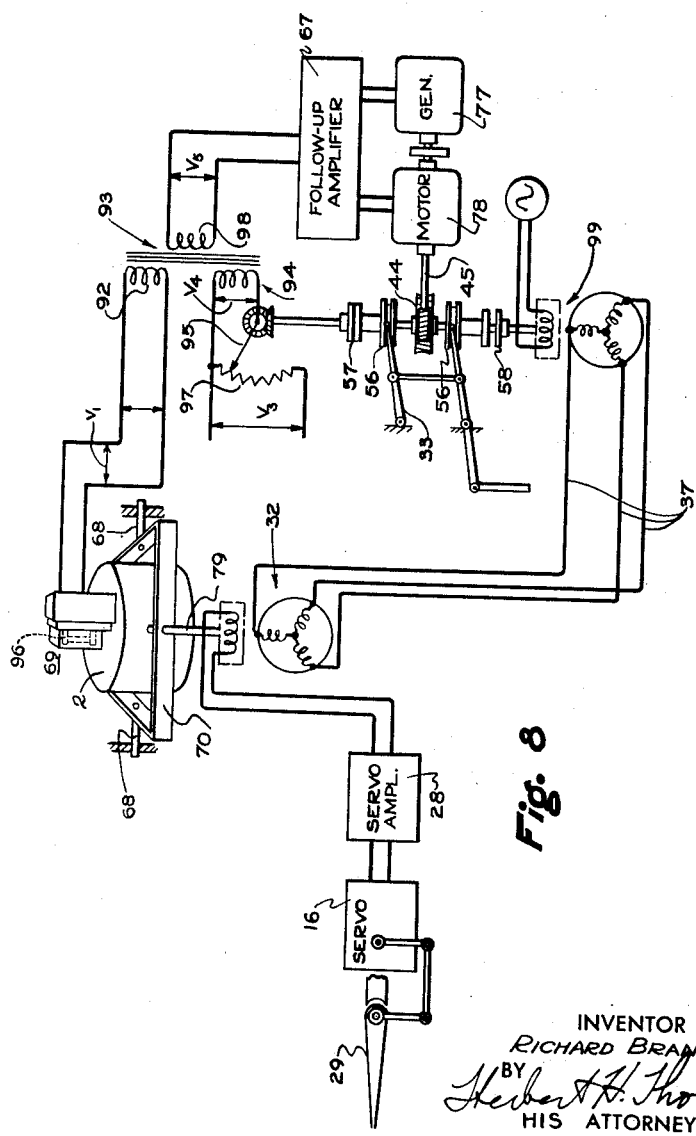

Patented May 22, 1951

2,553,546

UNITED STATES PATENT OFFICE 2,553,546

AIRPLANE AUTOMATIC PILOT

Richard Brannin, East Williston, N. Y., assignor to The Sperry Corporation, a corporation of Delaware Application January 31, 1945, Serial No. 575,487

12 Claims. (Cl. 244—77)

My invention relates to improvements in automatic pilots for airplanes which depend on a gyro-vertical as the datum for controlling the attitude of the craft; and the principal object of my improvement is to make an instrument which will automatically increase the angle of attack of the plane during banked turns so that the vertical lift shall remain constant and equal to the total weight of the craft, and so that the airplane shall not lose altitude while making a banked turn.

According to my invention, I provide on the craft some means responsive to a phenomenon accompanying the bank of the craft which produces a signal proportional to a function of the banking angle, and control by such signal the automatic pilot in such manner as to increase the angle of attack of the craft sufficiently to maintain the altitude during the banked turn. According to one form of the invention, this purpose is accomplished in a simple fashion by so mounting the gyro-vertical of the automatic pilot that a signal is produced for controlling the elevating plane of the craft, upon bank, by upwardly inclining the fore and aft pivotal axis of the gyroscope.

According to another form of the invention, I provide a means for measuring the lift of the wings and indicating said lift to the pilot; also a means of resolving the total lift at right angles to the wing-spread into horizontal and vertical components when the craft is banked. My invention further involves a follow-up device to control a reference quantity, generally a voltage, and to keep it proportional to the average lift while the craft is in straight and level flight. Another aspect of my invention involves the use of means for continuously comparing the vertical component of the total lift with said reference quantity while the craft is making a banked turn, and means for using the difference between the reference quantity and the vertical component of the lift to control the elevator of the airplane in such a manner that the vertical component of the lift will be kept constant and equal to the reference quantity while making turns.

Whenever the aircraft is banked or rolled sideways so that the spread of the wings is not horizontal, the vertical lift is reduced, though the total lift at right angles to the wings may remain the same if the angle of attack is unchanged. Consequently, an automatic pilot of the kind heretofore known, which maintains a constant angle of attack regardless of the angle of bank, allows the craft to lose height during a banked turn because the vertical lift becomes less than the weight of the craft which pulls it vertically downwards. Since the ratio of vertical lift to total lift is necessarily a function of the angle of bank, it follows that when the aircraft banks, the vertical lift can only be held at its full value by increasing the total lift proportionally to the proper function of the angle of bank.

The weight of a body does not depend on its mass only but also on the acceleration given to it. A body which is at a constant height above the earth's surface is subject to the acceleration of gravity of about 32 feet per second generally denoted by the symbol $g$. The weight of a body of mass $M$ is then given by the product $Mg$. If the body is not at constant height but is given an upward acceleration $a$ relatively to the earth, the total acceleration will be $g + a$ and the weight of the body will be increased temporarily to $M(g+a)$. If the body is an airplane, this upward acceleration can only be produced by increasing the lift and as this extra lift must come from the wings, the strain of the wings will be increased so long as the acceleration $a$ persists. Hence, anything that measures the wing strain will also measure the lift. Alternatively, if a vertical accelerometer is fitted in the machine to measure the total acceleration, $g+a$, the indications of this accelerometer multiplied by the mass of the airplane, supposed constant, will again give a measure of the lift of the wings.

According to my invention, I may measure the angle of bank alone and provide means in the automatic pilot to increase the total lift in proportion to the secant of that angle; or I may measure the total lift by means of an accelerometer or by observing the strain in the wing spar. The total lift being known, the true vertical lift can be deduced, since the vertical lift equals the total lift multiplied by the cosine of the angle of bank. Alternatively, I may measure the vertical lift directly by stabilizing the accelerometer by means of a gyro-vertical so that the instrument measures only the vertical component of any accelerations.

The objects and advantages of this invention will be apparent from the specification and the accompanying drawings in which several embodiments of the invention are shown.

Fig. 6 shows in diagrammatic form one arrangement of the invention where the lift is measured by strain gauges;

Fig. 7 shows a section of the wing spar with the strain gauge in place; and

Fig. 8 shows diagrammatically another form of the invention in which the vertical lift is measured by an accelerometer stabilized by the gyroscope.

Figure 1:
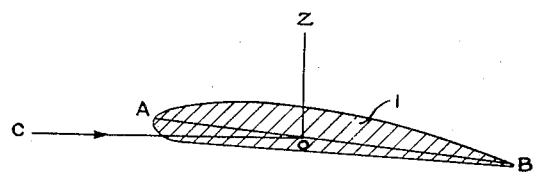
Fig. 1 shows a section of an airplane wing in flight.

Referring to Fig. 1, AB is a chord of the section 1 of the wing and CO is the direction of the relative wind. The chord AB is not the geometrical chord of the section but is an imaginary line fixed in the wing so that it will be parallel to the relative wind when the lift is zero. Then AOC is the angle hereinafter referred to as the angle of attack and the lift of the wing is proportional to the angle of attack as thus defined. The direction of lift of the wing is shown by OZ which is perpendicular to both the relative wind and the length of the wing, so that if the craft is to maintain a constant height the vertical component of the lift must be just equal to the gross weight of the craft.

If the air speed is kept at a constant value the total lift will be proportional to the angle of attack, but if the angle of attack is also kept constant the vertical component of the lift will diminish if the craft rolls or banks during flight. For example, when the airplane banks 90° so that the wings go from the normally horizontal to a vertical position, the vertical component of the lift will diminish to zero. Or to take another example, if the airplane banks 60°, the vertical component of the lift will be one-half the total lift normal to the wing spread. Hence, if the total lift were doubled when the machine banked 60°, say by doubling the angle of attack, then the vertical lift would remain as before, equal to the weight of the loaded craft, and the machine would not lose height while making a banked turn. Since the lift at constant air speed is proportional to the angle of attack, I attain this desired result by using the ordinary automatic throttle control to keep the air speed constant, and arrange to double the angle of attack when the airplane banks 60° as in this example. More generally stated, this form of my invention involves a method of automatically increasing the normal angle of attack for level flight in the ratio of the secant of the angle of bank.

Figure 2:
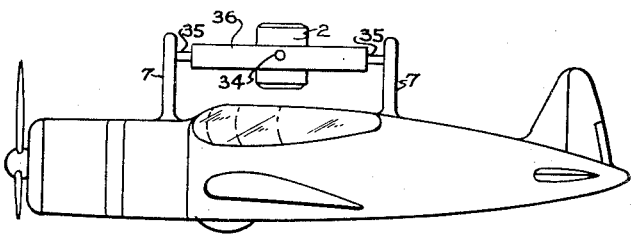
Fig. 2 is a side elevation of an airplane with a diagrammatic representation of a gyro-vertical of the usual type shown to an enlarged scale with reference to the aircraft.

Fig. 2 is a side view of an airplane in normal flight with a typical prior art gyroscopic horizon instrument which controls the attitude of the aircraft through the automatic pilot. In this view the gyroscope is shown to an exaggerated scale outside of and above the fuselage for the sake of illustrating the principles involved. The gyroscopic horizon consists of a rotor spinning rapidly inside the casing 2 about a vertical axis. Said casing is pivoted for rotation about a horizontal, athwartship axis 34 in a gimbal ring 36, which is itself pivoted at 35, 35 for rotation about a horizontal axis lying fore and aft in frame 7, 7 rigidly fixed to the craft. The gyroscope is constrained directly or indirectly by a gravitational device, so as to maintain its spin axis truly vertical in spite of the movements of the craft, and a transmitting device is provided at the pivots 34 so that any pitching movement of the craft, and therefore of the gimbal ring 36 round said axis 34 will transmit a signal to the automatic pilot and cause it to vary the angle of incidence to restore the machine to level flight. Several types of such gravitational and transmitting devices are well known in the art, as also are methods of causing the signal transmitted to operate the airplane controls.

Figure 3:
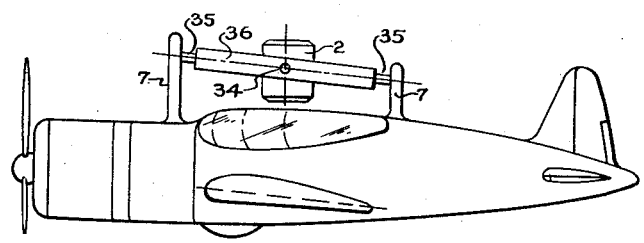
Fig. 3 is a side elevation of an airplane with a similar diagram of a gyro-vertical embodying my invention.

Heretofore it has been the practice when installing such apparatus in aircraft to take pains to ensure that the outer gimbal axis 35, 35 shall be horizontal during straight and level flight. According to my invention, however, the frame 7, 7 is so constructed and installed that the outer gimbal axis 35, 35 is parallel to the zero-lift chord AB of the wing section as shown in Fig. 3. Since the angle of attack is defined as the angle between said chord and the direction of the relative wind, it follows that during level flight the axis 35, 35 is elevated above the direction of the relative wind by the angle of attack.

Figure 4:
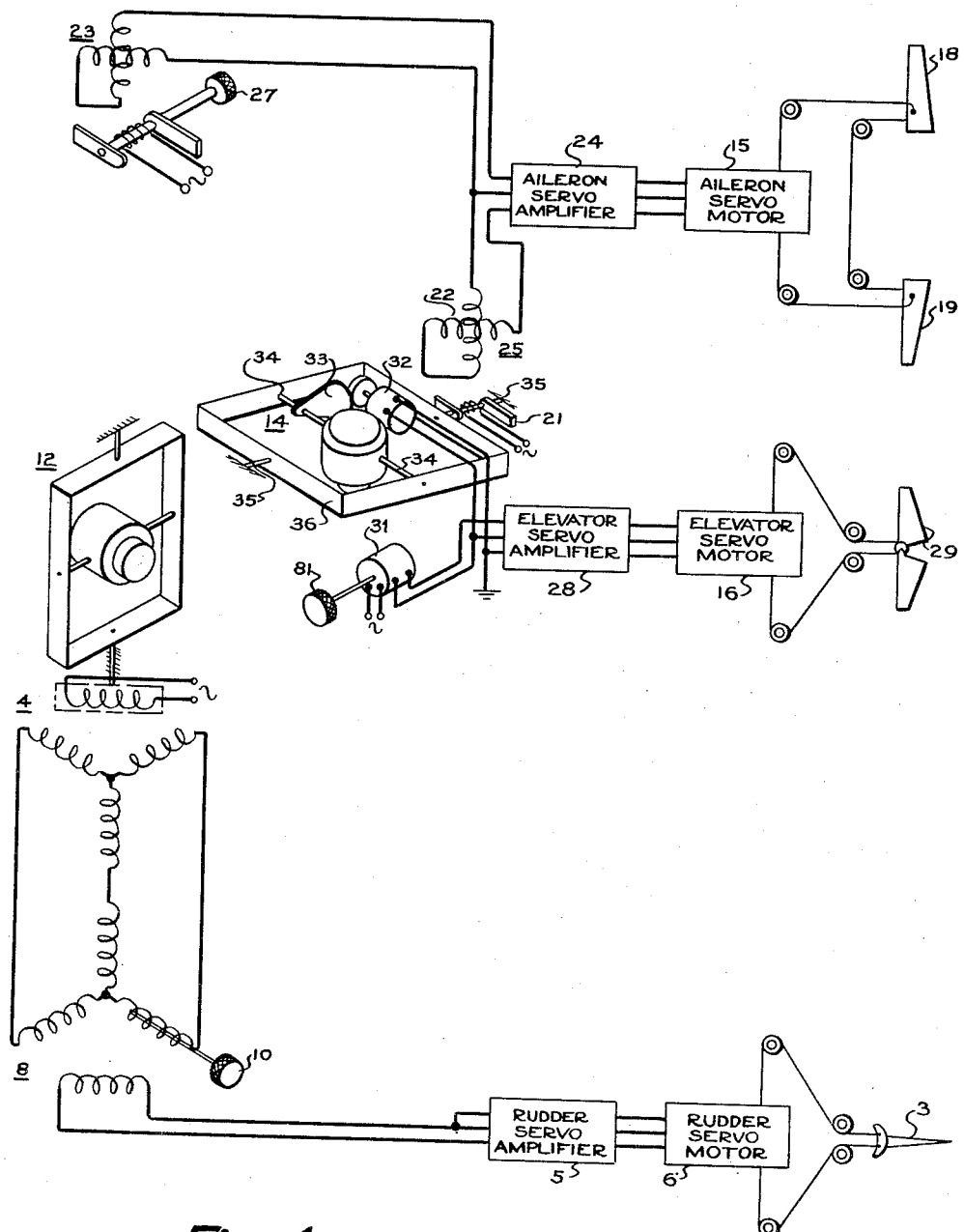
Fig. 4 is a diagram of a complete automatic gyro pilot embodying one form of the invention.

Fig. 4 shows a schematic diagram of a complete automatic gyro pilot embodying my invention. In this figure, the azimuth or compass device for controlling the steering of the aircraft is shown as the usual form of directional gyroscope 12, which controls the rudder 3 through any suitable form of pick-off device 4, a rudder servo amplifier 5 and servomotor 6. Manual control of the course is effected by means of the knob 10 which rotates the body of the Selsyn transmitter 8 so as to superpose the manual control on the automatic control.

The control of attitude about the two horizontal axes of the craft in pitch and roll is exercised by the gyro vertical 14, which has already been described. As shown in Fig. 4, the rotor is contained in the casing 2 which can turn about the horizontal athwartship axis 34 in gimbal ring 36. Said gimbal ring its itself pivoted about the fore-and-aft axis 35, 35. Axis 35 is inclined upwardly in front so as to be parallel with the zero-lift chord of the wing of the airplane. When the craft rolls, the relative angular movement of the gimbal ring 36 around axis 35, 35 is transmitted to the aileron servo amplifier 24 through the transmitter 25, which is shown as being of the "Telegon" type in which all the windings are stationary and only the soft iron armature 21 is rotated within the stationary winding 22. A similar transmitter 23 controlled by knob 27 is used for manual control of the banking angle. The output voltage of transmitter 23 is fed to the aileron servo amplifier 24 in series opposition with the voltage produced by the pick-off device 25 on the roll axis of the gyro vertical. Amplifier 24 energizes the aileron servomotor 15 which operates the ailerons 18, 19.

Pitching movements of the craft cause relative movement between the gyro casing 2 and the gimbal ring 36 around the athwartship axis 34.

A similar transmitter 32 for the transmission of pitch is fixed on gimbal ring 36 and driven from the pitch axis 34 through the toothed sector 33. The output from this transmitter feeds through the elevator servo amplifier 28 to the servomotor 16 which controls of the elevator 29. Manual control of the elevator is given by the knob 81 which operates transmitter 31, and superposes its signal on that of transmitter 32 in the amplifier 28.

When an airplane rotates or rolls from the level to a banked position, the axis of rotation is the line of direction of the relative wind. Thus in Fig. 5 let AD be the line of direction of the relative wind; CD the direction of the outer gimbal axis 35, 35 of the gyro vertical 14 in Fig. 4, then CDA is the angle of attack. Hence, when the ship banks, it will roll round AD as axis, and the axis CD, which is fixed to the ship, will sweep out a cone and the point C on the gimbal axis will describe a circular arc, going say from C to C' where CAC' is equal to B, the angle of bank. While this occurs, the athwartship trunnion axis 34 in the gimbal ring 36, Fig. 4 will remain truly horizontal but the forward end of the gimbal axis 35, 35 will have moved down from C to C' in Fig. 5 and the elevation of its front end above the line of the relative wind will have been reduced from AC to A'C' since the line AA' is horizontal with respect to the earth. To reach this position the gimbal ring 36 must rotate about axis 34 in the stabilized gyro casing 2, and although in fact the motion may be pure roll the transmitter 32 will pass a signal to the elevator amplifier as though the craft had pitched nose down. The automatic pilot will then automatically move the elevator 29 to increase the angle of attack, and the point C' in Fig. 5 will be moved out radially to C'' which is at the same height above AA' as C. In other words, the angle of attack and hence the total lift in a direction normal to the wing span will have been increased from AC to AC'', that is from AC to AC sec. B. However, the vertical component of lift will remain equal to the original vertical component for all angles of bank and the craft will neither pitch nose down nor lose height when banked as it would do with any pre-existing type of gyro horizon as typified by Fig. 2.

Figure 5:
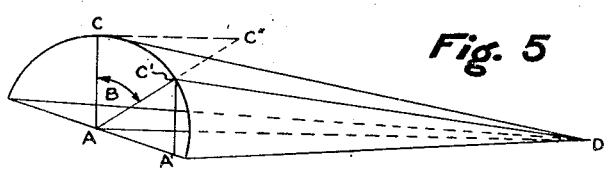
Fig. 5 is a diagram to illustrate the principle of one form of my invention.

Fig. 5 is drawn so as to give a general explanation of the operation of my invention. To be accurate, the triangle ACC'' and other parts of the figure should be inscribed on a spherical surface centered at D. However, for small values of the angle of attack ADC such as occur in practice, the quantitative result obtained from a plane triangle is substantially accurate.

According to the hereinbefore described form of my invention, the increase of the total lift is made to depend directly on the angle of bank of the craft as measured by the gyro vertical and the total lift is increased so as to maintain the vertical component of the lift at the same level as before. The same result might be obtained from a measurement of changes in the actual vertical lift which can be obtained either from strain gauges in the wings or from an accelerometer carried in the airplane.

Referring to Fig. 6, this shows the method of application of the invention when the total lift is measured by the strain of the wings. Any suitable strain gauge may be used for this purpose, but preferably I use a gauge of the type employing a continuous solid filament of electrical conducting material bonded throughout its effective length to the surface of the strained member so that its length and electrical resistance vary in response to the strain. Strain gauges of this type have been described by Arthur C. Ruge in U. S. Patent 2,334,843.

Referring to Fig. 7, four strain gauges 50, 51, 52 and 53 are secured to the wing spar 54 so that when the wing is loaded, the gauges 50 and 51 are in compression and 52 and 53 in tension. The four gauges are connected in a Wheatstone bridge circuit as shown in Fig. 6, the diagonal being fed with alternating current from a suitable source as shown at 55. The output voltage $V_1$ is then proportional to the total lift. This voltage $V_1$ is conducted by suitable leads to an amplifier 62 which has an alternating-current output voltage $V_2$ greater than $V_1$ but still proportional to the total lift. A voltmeter or other voltage indicating device 63 may be connected so as to provide the airman with a visual indication of the total lift. The output $V_2$ of amplifier 62 excites one winding of a signal transformer 64 mounted on the fore and aft gimbal axis 68, 68 of a vertical gyro 69. This corresponds to the gyro vertical 14 of Fig. 4, but the axis 68, 68 is arranged in this case to be horizontal during normal level flight. The signal transformer 64 is so aligned that the output voltage $V_3$ is equal to the input voltage $V_2$ multiplied by the cosine of the bank angle as given by the vertical gyro. The voltage $V_3$ is then proportional to the vertical component of the lift.

Transformer 65 has three windings as shown in Fig. 6, and these are connected so that the voltages $V_3$ and $V_4$ are in opposition and any difference goes to the amplifier 67 of the velocity follow-up. The voltage $V_4$ is derived from the secondary winding of a signal transformer 66, the primary of which is excited from a single-phase alternating-current supply at a fixed voltage. The primary and secondary windings of transformer 66 can be rotated relatively to one another by electric motor 78 as more fully described hereinafter in order to vary the voltage $V_4$.

The velocity follow-up amplifier 67 consists of a phase-sensitive amplifier cooperataing with a two-phase motor 78 and a generator 77 coupled to the motor and connected to the input of the amplifier so as to provide a high negative feedback proportional to the speed of the motor. In this way, the motor speed is kept proportional to the input voltage supplied to the amplifier and is independent of load or friction. Such amplifier and motor systems are well known in the art and do not require further description.

When the aircraft is flying straight, the turn control knob 18, Fig. 4, of the automatic pilot is located by a detent, and the clutch linkage 9 in Fig. 6 which is operated by the control knob connects the motor 78 and generator 77 to the variable ratio signal transformer 66 which controls the magnitude of the voltage $V_4$. The follow-up motor 78 then runs in one direction or the other as requisite to make the voltage $V_4$ balance the voltage $V_3$ in the windings of the transformer 65. The voltage $V_4$ then is a measure of the average vertical component of the lift of the airplane in normal straight flight, i. e., of its weight.

The aileron servomotor is controlled automatically from the roll axis 68 of the gyro by transmitter 26 or manually by knob 27 when it is desired to cause the craft to bank as already described with reference to Fig. 4.

When it is desired to set the craft into a banked turn, the manual aileron control knob 27 of the automatic pilot is rotated and the turn control knob 10 of the automatic pilot is rotated from the position in which it was held by the detent in normal straight flight. This latter movement shifts the clutch linkage 9 and disconnects the motor 78 from the signal transformer 66 which is now held by friction brake 11. The clutch linkage then engages the motor to pitch signal transformer 86, which through the three lines 87 supplies pitch Selsyn 88 on pitch axis 79 of the vertical gyroscope. This Selsyn 88 operates the elevator or pitch control of the craft. As the plane banks into a turn, the lift of the wings becomes inclined to the vertical and although the total lift may not alter, nevertheless, the voltage $V_3$, which measures the vertical component of the lift, becomes smaller than $V_4$ which represents the average value of the vertical lift in straight flight. The difference $V_4-V_3$ causes the follow-up 78 to rotate the pitch signal output from Selsyn 88 in such a direction that the outcoming signal after passing through the elevator amplifier 28 and the elevator servo system 16 will operate the elevator 29 so as to increase the angle of attack and thereby increase the total lift until the voltage $V_3$ is equal to $V_4$.

When it is desired to resume straight flight, the turn control knob is returned to the detent position. The action is then reversed and the angle of attack is decreased until the vertical lift is again equal to the average value before starting the turn, which average value is represented by $V_4$. Clutch linkage 9 may be prevented from returning to the starting position by a dash-pot or other delayed action device, which will give the follow-up motor sufficient time, normally a few seconds, to complete its function of adjusting the lift after stopping the turn. After this delay, the motor 78 will again be clutched to signal transformer 66 so as to maintain the voltage $V_4$ at the proper value in readiness for the next turn.

Fig. 8 shows an alternative form of my invention in which I use an accelerometer to measure the true vertical lift. Any convenient form of accelerometer may be used for this purpose; for instance, that disclosed by R. K. Bonell in U. S. Patent 2,210,970.

The accelerometer proper 96 is shown in Fig. 8 as mounted on the case 2 of the gyro vertical of the automatic pilot which is pivotally suspended by athwartships pivots 79, which form the pitch axis in a gimbal ring 70, which is free to turn round roll axis 68, 68. The windings of the accelerometer may be connected by the method shown in Bonell's disclosure, so as to give an output voltage $V_1$ proportional to the true vertical acceleration of the craft. So long as the craft maintains its height, the voltage given by the accelerometer system will be proportional to the mass of the airplane multiplied by $g$, the earth's gravitation, but if the airplane begins to climb or dive, the accelerometer voltage will increase or decrease.

The accelerometer voltage hereinafter referred to as $V_1$ is applied to one of the two primary windings 92 of a transformer 93. The other primary winding 94 is fed with a voltage $V_4$ which, as in the previous case, represents the normal vertical lift to support the weight of the airplane. The value of $V_4$ is adjusted in this case by a sliding contact 95 moving over a resistance or inductance 97 fed with a steady single-phase alternating voltage $V_3$ from a suitable generator.

If the accelerometer is of a type that is free from drift, so that the voltage output for an acceleration of one $g$ is always the same, then the sliding contact 95 may be adjusted by hand on resistance 97 to give this voltage as $V_4$ across winding 94. For the sake of completeness in the present disclosure it will be assumed that the accelerometer is liable to drift and that the voltage $V_4$ requires automatic adjustment from time to time to match the voltage given by the accelerometer for an acceleration of one $g$, i. e., when the craft is in level flight. In that case the sliding contact will be driven by gearing as shown, by follow-up motor 78 as now to be described.

The secondary winding 98 of the transformer 93 gives out a voltage $V_5$ which is proportional to the difference between the accelerometer voltage $V_1$ and reference voltage $V_4$. The voltage $V_5$ is applied to a follow-up amplifier 67 through which it operates follow-up motor 78 and generator 77 as in the previous case. Follow-up motor 78 drives through a worm gear 44 and shaft 45 which by means of a clutch fork 56 can be made to engage either of two clutches 57 and 58. When engaged with clutch 57, it drives the slider 95 on resistance 97 so as to adjust the value of $V_4$ to be equal to $V_1$ when the airplane is flying straight. When the plane is set to make a banked turn, shaft 45 is engaged with clutch 58 to drive the Selsyn transmitter 99. In either case, motor 78 runs in such a direction as will reduce the value of $V_5$ to zero, by adjusting resistance 97 while in level flight or by adjusting elevator 29 during a turn.

The rotor of transmitter 99 which is driven by shaft 45 is energized with singe-phase, alternating-current from an external source and acts as the primary of a variable transformer with a three-phase secondary. Rotation of the primary shifts the phases of the A. C. secondary currents in the three lines 37 which supply the stator of the pitch Selsyn 32, the rotor of which is mounted on spindle 79 of the gimbal ring of the gyro vertical 69. The output of this secondary winding is then used to control the elevator 29 of the airplane through an amplifier 28 and servomotor 16 as in the previous case. It will be understood that the Selsyn 32 acts as a signal mixer or differential and that the output it gives to the elevator amplifier combines a component due to pitch of the craft round axis 79 of the gyro, and the component derived from the accelerometer.

Although not shown in Fig. 8 it will be understood that the complete automatic pilot would comprise an aileron servo and means for controlling same automatically from gyro gimbal axis 68, or manually by a knob, as shown in Figs. 4 and 6.

By either of the alternative arrangements of my invention as hereinbefore described with reference to Figs. 6 and 8, the lift can be measured continuously during flight and indicated to the pilot by an instrument on the panel; the instantaneous values can be integrated, resolved into horizontal and vertical components, and the vertical component used to control the elevator to keep the plane at a constant height while making the turn.

The device operates as a servo mechanism and introduces whatever correction to the elevation position is necessary to maintain the vertical component at the desired value. It operates not only in level flight, but equally well in a glide or in a steady climb and it not only takes into account and corrects for any changes in the bank angle, but also for changes in loading, engine speed, or air speed and will correct for variations in any or all of them so long as the craft is kept within its safe operating range either by the airman or by safety devices, such as are incorporated in many standard types of automatic pilots.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft including a gyro vertical supported in the craft by a gimbal ring, of which one axis is horizontal and athwartship of the craft and the other axis generally fore and aft of the craft but upwardly inclined so as to be parallel to the chord of the airplane wing section, a detecting and transmitting device responsive to relative tilt about said horizontal athwartships axis of said gyro vertical and said gimbal ring, and servo means operated by said transmitting device for controlling the elevator of the craft so as to maintain the craft at a constant height when flying at a constant air speed irrespective of the angle of bank.

2. In an automatic pilot for aircraft, means for automatically setting up a standard reference signal proportional to the lift of the wings when the craft is in straight and level flight, means for comparing said standard signal with a transient signal representing the lift under other conditions than straight level flight, and means for controlling the elevator of the craft according to the difference between said standard signal and said transient signal so as to maintain the aircraft at a constant height.

3. In an automatic pilot for aircraft having an elevator, a servomotor therefor, and means for producing a signal upon pitch of the craft for operating said elevator, said means being characterized by and including a gyro vertical having its gimbal system forwardly, upwardly inclined so that banking of the craft introduces a pitch signal acting through the servo system and elevator in such a manner that the angle of attack will be increased in the ratio of the secant of the banking angle, so that the vertical component of the lift of the wings at constant airspeed shall be constant for all usual angles of bank.

4. In an automatic pilot for aircraft having automatic elevator control depending partly on the strain in the wings due to the lift and partly on angular pitch of the craft relatively to a gyro vertical, a device for modifying the elevator control signal according to the angle of bank during a turn, said device consisting of means adapted to give continuously a first signal proportional to the total lift of the wings, means depending upon the angle of bank for deriving from said first signal a second signal proportional to the vertical component of the said total lift, means for generating a third signal proportional to the lift in normal horizontal flight, means for comparing said second signal with said third signal and means depending upon the difference between said second signal and said third signal to control the elevator of the airplane so as to alter existing lift and to reduce said difference to zero to prevent the craft from losing height.

5. In an automatic pilot for aircraft, a strain gauge device attached to the wings or wing spars of the craft providing a signal proportional to the existing lift, means for resolving said signal into vertical and horizontal components according to the bank angle of the craft, means for producing a signal proportional to the lift of the craft in normal horizontal flight, means for comparing the vertical component of the signal of said resolving means and the signal of said producing means, and means for controlling the elevator of the aircraft according to the difference between said compared signals to alter the existing lift to reduce the difference.

6. In an automatic pilot for aircraft, a gyroscopically stabilized accelerometer providing a signal proportional to the existing lift, means for producing a signal proportional to the lift of the craft in normal horizontal flight, means for comparing the signal of said accelerometer and producing means, and means for controlling the elevator of the aircraft according to the difference between said compared signals to alter the existing lift to reduce the difference.

7. In an automatic pilot for aircraft, a strain gauge device attached to the wings or wing spars of the craft providing a signal proportional to the existing lift, means for providing a standard reference signal proportional to the lift of the wings of the craft when the same is in straight level flight, and means for controlling the craft in accordance with the difference between the reference and strain gauge signals to maintain the craft at a constant height during flight.

8. In an automatic pilot for aircraft having an element operable to change the lift of the wings of the craft, servo means operatively connected to said element, signal means attached to the wings of the craft for measuring the strain therein, means for establishing a reference signal proportional to the lift of the wings when the craft is in straight and level flight, and means for operating said servo means in accordance with the difference between said reference and strain signals to alter the lift of the wings of the craft and reduce the difference to zero.

9. In an automatic pilot for aircraft having a servo means operable to control the attitude of the craft about its pitch axis, a gyro vertical having a fore and aft axis inclined slightly upwardly to make the same substantially parallel to the chord of zero-lift of the wing section of the craft, pitch signal producing means for said gyro vertical operatively connected to said servo means, and means for causing the craft to bank and turn, said producing means providing a signal during the turn that is proportional to the banking angle so as to maintain the craft at a constant altitude.

10. In an automatic pilot for aircraft having a servo means operable to control the attitude of the craft about its pitch axis, a reference device having a pitch signal producing means operatively connected to said servo means, means for causing the craft to bank and turn, and means for modifying the signal of said producing means in accordance with the angle of bank to maintain the craft at a constant altitude during the turn including a strain gauge device in the wings of the craft.

11. In an automatic pilot for aircraft having a servo means operable to control the attitude of the craft about its pitch axis, a gyro vertical having a pitch signal producing means operatively connected to said servo means, means for causing the craft to bank and turn, and means for modifying the signal of said producing means in accordance with the angle of bank to maintain the craft at a constant altitude during the turn including an accelerometer stabilized by said gyro vertical.

12. In a turn control system for dirigible craft, signal means for controlling the elevation of the craft having two relatively displaceable parts, a vertical craft axis accelerometer operatively connected to one of said parts, and a device providing a reference about the pitch axis of the craft operatively connected to the other of said parts.

RICHARD BRANNIN.

REFERENCES CITED

The following references are of record in the file of this patent:

UNITED STATES PATENTS

| Number | Name | Date |
|---|---|---|
| 1,801,948 | Boykow | Apr. 21, 1931 |
| 1,826,013 | Meredith | Oct. 6, 1931 |
| 1,869,840 | Boykow | Aug. 2, 1932 |
| 2,005,530 | Boykow | June 18, 1935 |
| 2,191,250 | Fischel | Feb. 20, 1940 |
| 2,196,385 | De Florez et al. | Apr. 9, 1940 |
| 2,222,886 | Voigt | Nov. 26, 1940 |
| 2,311,642 | Crane et al. | Feb. 23, 1943 |
| 2,386,521 | Watter | Oct. 9, 1945 |